United States Patent [19]

Lawson et al.

[11] 4,440,733
[45] Apr. 3, 1984

[54] THERMOCHEMICAL GENERATION OF HYDROGEN AND CARBON DIOXIDE

[75] Inventors: Daniel D. Lawson, Arcadia; Christopher England, Sierra Madre, both of Calif.

[73] Assignee: California Institute of Technology, Pasadena, Calif.

[21] Appl. No.: 204,477

[22] Filed: Nov. 6, 1980

[51] Int. Cl.³ .................................................. C01B 13/00
[52] U.S. Cl. ...................................... 423/437; 422/189; 423/539; 423/648 R
[58] Field of Search ..................... 423/539, 540, 415 R, 423/648 R, 437, 530, 531, 522, 541 R, 542, 543; 48/202, 210; 252/372; 422/149, 189, 232, 160; 204/92, 93, 104, 129

[56] References Cited

U.S. PATENT DOCUMENTS

| | | | |
|---|---|---|---|
| 1,818,901 | 8/1931 | Mallery | 423/525 |
| 2,687,946 | 8/1954 | Manning et al. | 423/541 |
| 2,894,819 | 7/1959 | Catanach | 422/160 |
| 3,359,069 | 12/1967 | Furkurt et al. | 423/541 |
| 4,053,573 | 10/1977 | Harrer et al. | 423/525 |
| 4,059,496 | 11/1977 | Schulten et al. | 204/104 |
| 4,082,519 | 4/1978 | Steiner | 48/202 |
| 4,256,721 | 3/1981 | Blakey et al. | 423/540 |
| 4,306,950 | 12/1981 | Lu | 204/104 |
| 4,314,984 | 2/1982 | Lawson et al. | 423/579 |

*Primary Examiner*—Helen M. McCarthy
*Assistant Examiner*—Wayne A. Langel
*Attorney, Agent, or Firm*—Marvin E. Jacobs

[57] ABSTRACT

Mixing of carbon in the form of high sulfur coal with sulfuric acid reduces the temperature of sulfuric acid decomposition from 830° C. to between 300° C. and 400° C. The low temperature sulfuric acid decomposition is particularly useful in thermal chemical cycles for splitting water to produce hydrogen. Carbon dioxide is produced as a commercially desirable byproduct. Lowering of the temperature for the sulfuric acid decomposition or oxygen release step simplifies equipment requirements, lowers thermal energy input and reduces corrosion problems presented by sulfuric acid at conventional cracking temperatures. Use of high sulfur coal as the source of carbon for the sulfuric acid decomposition provides an environmentally safe and energy efficient utilization of this normally polluting fuel.

10 Claims, 2 Drawing Figures

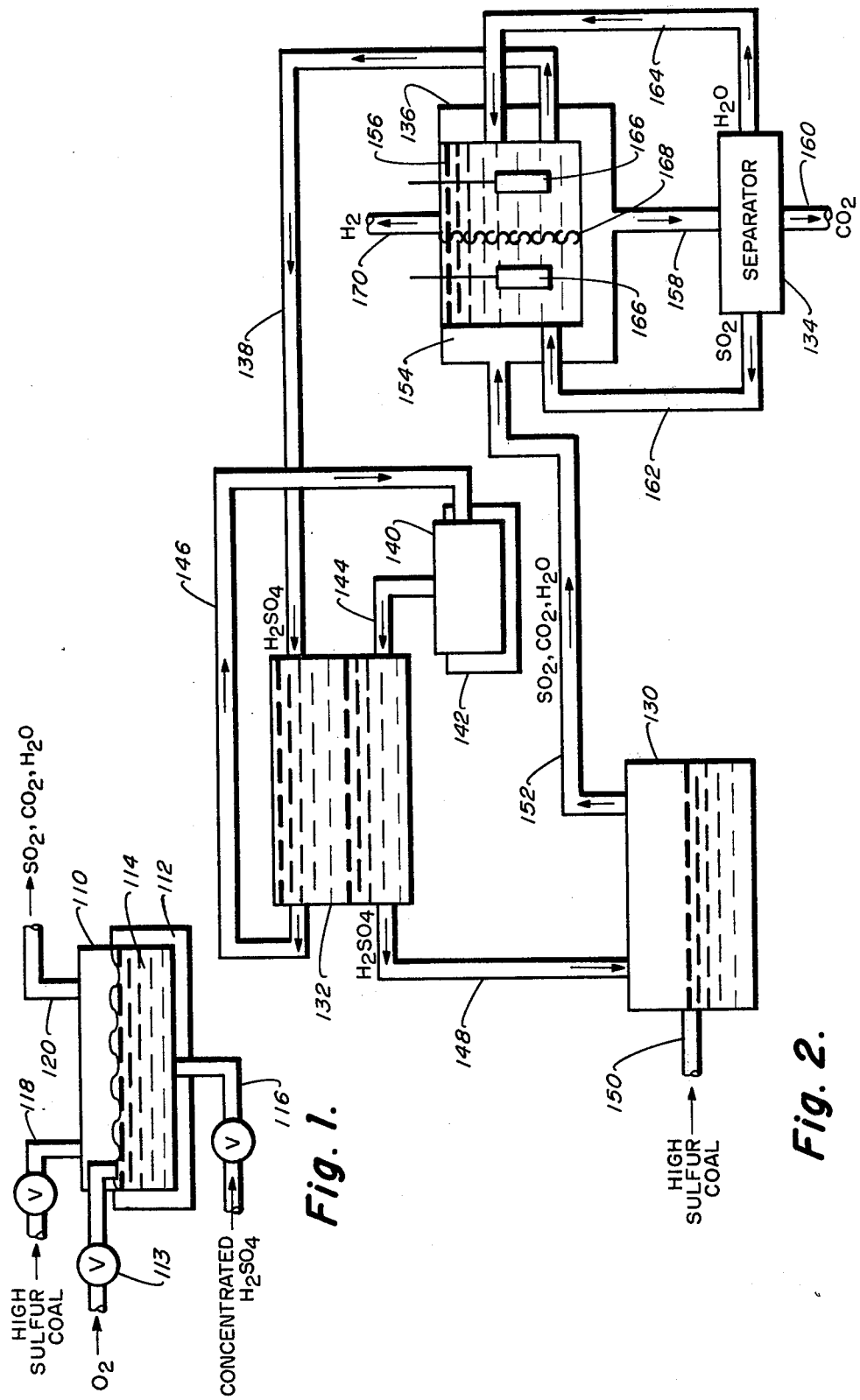

THERMOCHEMICAL GENERATION OF HYDROGEN AND CARBON DIOXIDE

DESCRIPTION

1. Origin of the Invention:

The invention described herein was made in the performance of work under a NASA contract and is subject to the provisions of Section 305 of the National Aeronautics and Space Act of 1958, public law 83-568 (72 Statute 435; 42 U.S.C. 2454).

2. Technical Field

The present invention relates to the thermochemical production of hydrogen and other useful gases such as carbon dioxide. More particularly, the present invention relates to water splitting thermochemical cycles based upon thermal cracking of sulfuric acid.

3. Background Art

Hydrogen has been identified as a flexible fuel form that:

1. permits storage of energy over a wide range of time periods (from hours to years);
2. enables efficient energy transport over long distances within available distribution networks;
3. offers chemical and physical characteristics which propose several distinct applications:
   as a chemical feedstock,
   as a fuel for electrochemical fuel cell systems in decentralized power generating stations, and
   as a fuel supplement to natural gas.

Most of the hydrogen is currently produced through steam reforming of natural gas. Natural gas is a depleting, finite resource as are all of the other fossil fuel sources and is becoming increasingly expensive. New hydrogen production technologies are in the process of development such as coal gasification, water electrolysis or thermochemical water splitting. While coal gasification appears to be the most likely alternative for large scale production of hydrogen, the other technologies appear more competitive for supplying small scale uses (i.e. less than 1 million cubic feet a day).

Thermochemical processes are being explored since thermal energy available from thermonuclear reactors and/or from solar collectors can be fixed as hydrogen, a storable fuel. The decomposition of water by thermochemical means proceeds according to the reaction:

$$H_2O(l) \rightarrow H_2(g) + \tfrac{1}{2}O_2(g) \qquad (1)$$

An analysis of the thermodynamics of the cycle requires that energy and entropy be supplied in the cycle. The main feature of this reaction is its highly endothermic nature requiring an input of 286,000 kj/kg-mol. Therefore, the reaction must be practiced as close as possible to ideal conditions in order to be practical.

In a number of thermochemical cycles under active investigation, the oxygen release step is the thermal decomposition of sulfuric acid:

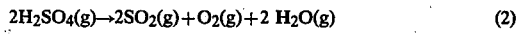

$$2H_2SO_4(g) \rightarrow 2SO_2(g) + O_2(g) + 2H_2O(g) \qquad (2)$$

This reaction is highly endothermic requiring a temperature of between 800° C. and 900° C. to thermally crack the sulfuric acid. The high temperature required to thermally crack sulfuric acid causes severe equipment problems in providing suitable materials to withstand the corrosive action of the superheated sulfuric acid and additionally, severe problems have been experienced in attempts to adequately heat the sulfuric acid to the high temperatures necessary for cracking.

The thermochemical system disclosed in pending patent application entitled THERMOCHEMICAL GENERATION OF HYDROGEN AND CARBON DIOXIDE, (D. D. Lawson, et al—inventors, U.S. Ser. No. 145,207 filed on Apr. 30, 1980 now U.S. Pat. No. 4,314,984, issued Feb. 9, 1982) is an example of recent attempts to improve thermal efficiency in heating the sulfuric acid to cracking temperatures. The contents of this prior application are hereby incorporated by reference. This prior art thermochemical system includes a thermal source, such as a very high temperature nuclear reactor or solar concentrator, an oxygen splitting decomposition reactor, an electrochemical hydrogen reactor, a sulfuric acid preheater, and a decomposition gas heat exchanger and separator. The thermal source heats a heat exchange fluid such as helium to the high temperatures necessary for thermal cracking of sulfuric acid. The hot heat exchange fluid is passed through a coil to provide sufficient heat to decompose the sulfuric acid to sulfur dioxide, oxygen and water. The hot decomposition gases ($SO_2$, $O_2$, $H_2O$) are passed to the heat exchanger where heat is transferred to a special perfluorocarbon heat exchange liquid. The perfluorocarbon heat exchange liquid is then passed to a sulfuric acid preheater for directly heating the sulfuric acid to temperatures of 300° C. to 400° C. prior to entry into the thermal decomposition reactor.

After partial cooling in the heat exchanger, the oxygen is removed from the decomposition gases with the remaining sulfur dioxide and water being passed to an electrochemical hydrogen reactor where hydrogen and sulfuric acid are generated.

The above-described prior art system provides an improved method for heating sulfuric acid to cracking temperatures and is well suited for its intended purpose; however, it is desirable to provide a thermal chemical cycle based on sulfuric acid decomposition which does not require high cracking temperatures and the resultant corrosion and heating problems.

SUMMARY OF THE INVENTION

In accordance with the present invention, a thermal chemical method and system is provided where decomposition of sulfuric acid is carried out at a much lower temperature than the thermal cracking temperatures of conventional processes. Specifically, the decomposition temperature is reduced from about 800° C. to 900° C. to about 300° C. to 400° C. The low temperature sulfuric acid decomposition of the present invention is particularly useful in thermo chemical cycles for splitting water to produce hydrogen. By lowering the temperature at which sulfuric acid decomposition takes place, equipment is simplified, energy input is lowered and corrosion problems are reduced.

Further, the low temperature decomposition of sulfuric acid in accordance with the present invention produces high purity carbon dioxide along with sulfur dioxide and water. This highly pure carbon dioxide is a commercially useful gas which can be used in secondary oil recovery, carbonation of soft drinks, beer and charging of fire extinguishers. Additionally, the low temperature sulfuric acid decomposition of the present invention may be utilized in heat transfer systems based on catalytic reaction of sulfur dioxide, oxygen and water to form useful heat and sulfuric acid.

The present invention is based on the discovery that carbon, in the form of carbonaceous material, when added to sulfuric acid, which has been heated to a temperature of between 300° C. and 400° C., reacts with the hot acid to produce sulfur dioxide, carbon dioxide and water as decomposition gases. Virtually any carbonaceous material may be used in accordance with the present invention. However, carbon containing materials which do not include hydrogen, such as graphite, will not react with the acid. Coals, peat, shale oil, rubber, biomass and many other carbonaceous materials may be used. The use of high sulfur coal, oil or residuals as a suitable carbonaceous material is particularly attractive since it provides a new use for high sulfur carbonaceous materials which are presently an environmental and economic liability.

The decomposition gases produced in accordance with the present invention may be used in a number of different processes. For example, in addition to use of the $SO_2$ and $H_2O$ generated during decomposition for water splitting processes as cited above, the $SO_2$ and $H_2O$ may be transported to a catalytic reactor where oxygen is added in the presence of a suitable catalyst to produce heat and sulfuric acid. In addition, the carbon dioxide in the decomposition gases may be separated from the sulfur dioxide and water prior to or after transportation and utilized commercially as previously discussed.

As contemplated by the present invention, the use of high sulfur coal is particularly desirable in the new thermochemical system. At present, high sulfur coal is economically and environmentally undesirable due to high sulfur dioxide emissions during burning. Since in the present invention, sulfur dioxide is a desirable decomposition gas, high sulfur content coal is an advantageous reactant. As will be realized, the present invention not only significantly reduces heating and corrosion problems inherent in high temperature sulfuric acid cracking, but at the same time provides a desirable, environmentally safe use for high sulfur coal.

These and many other features and attendant advantages of the present invention well become apparent as the invention becomes better understood by reference to the following detailed description when considered in conjunction with the accompanying drawings.

BRIEF DESCRIPTION OF THE DRAWINGS

FIG. 1 is a schematic representation of the present invention; and

FIG. 2 is a schematic view of a thermochemical system in accordance with a preferred embodiment of the present invention.

DETAILED DESCRIPTION OF THE INVENTION

The conventional thermochemical cycle for producing hydrogen is based on a series of reactions of at least two and generally three reactions to split water into hydrogen and oxygen. The generalized three step reaction based on sulfuric acid is as follows:

$$2HX \rightarrow H_2 + X_2 \tag{3}$$

$$X_2 + SO_2 + 2H_2O \rightarrow H_2SO_4 + 2HX \tag{4}$$

$$H_2SO_4 \rightarrow H_2O + SO_2 + \tfrac{1}{2}O_2 \tag{5}$$

Examples of suitable cycles are the sulfur-iodine cycle where X is I, and the sulfur-bromine cycle where X is Br. Usually step 3 is driven electrochemically. The conventional hybrid electrochemical sulfur cycle is based on only two reactions:

$$2H_2O + SO_2 \rightarrow H_2 + H_2SO_4 \tag{6}$$

$$H_2SO_4 \xrightarrow{830° C.} H_2O + SO_2 + \tfrac{1}{2}O_2 \tag{7}$$

Reaction (6) is driven electrochemically.

In accordance with the present invention, carbonaceous material is added to the sulfuric acid in the cracking or oxygen release step (reactions 5 and 7) according to the following equation $$2H_2SO_4 + C \xrightarrow{300° C.} 2SO_2 + 2H_2O + CO_2 \tag{8}$$

The particular carbonaceous material which is added to the sulfuric acid is not important. Suitable carbonaceous materials include rubber, peat, shale oil, biomass and coal. The most important criteria is that the carbonaceous material include hydrogen bound in one form or another to the carbon. For example, carbon in the form of graphite has been found unsuitable for use in the present invention. The lack of reaction between graphite and hot sulfuric acid is believed due to the absence of hydrogen. The presence of other materials found in carbonaceous materials, such as oxygen, sulfur, and nitrogen, do not appear to promote or inhibit the reaction except for the dilution effects caused by their presence. The exact amount of hydrogen required to carry out the reaction is not known. It appears only that some hydrogen must be present in the carbonaceous material to carry out the reaction.

Coals are preferred carbonaceous materials. A wide variety of coals ranging from sub-anthracite and anthracite through bituminous and sub bituminous to lignite may be used.

The preferred coals are high sulfur coal. High sulfur coal is preferred not so much because it cracks the sulfuric acid better, but is preferred because use of high sulfur coal in this process provides a valuable use for this environmentally burdensome fuel. The high sulfur coal typically will have a sulfur content above 2 percent by weight. The sulfur in the coal or any other carbonaceous material is believed to be converted to sulfur dioxide which is a desired product of the reaction.

The coal may be added to the sulfuric acid in any convenient manner. The size of the coal particles and method of mixing are not critical and only affect the speed of reaction. It is preferred that the coal be added to the hot sulfuric acid (330° C.) as a slurry in room temperature or slightly warmed concentrated sulfuric acid. The particles should be between about 50 to 250 mesh. The amount of acid necessary to form the slurry may be varied depending on desired viscosity.

The coal is added in sufficient amounts to hot sulfuric acid to decompose the entire amount of sulfuric acid with 1 gram of coal being sufficient to decompose about 15 grams of concentrated sulfuric acid. This ratio may vary depending upon contaminants, such as oxygen and other impurities in the coal. It is preferred that the sulfuric acid be concentrated, i.e. 98% of $H_2SO_4$ by weight; however, less concentrated acid may be used in accordance with the present invention, but this results in slower reaction times and less efficient production of decomposition gases.

Referring to FIG. 1, a suitable acid resistant thermal reactor 110 is seated in a heating mantle 112. The heating mantle generates sufficient heat to raise the temperature of the sulfuric acid 114 within the thermal reactor 110 to between 300° C. and 400° C. The concentrated sulfuric acid is introduced into the thermal reactor 110 through conduit 116. Once the sulfuric acid has reached the desired temperature, high sulfur coal is introduced into the thermal reactor through line 118 in the form of the above identified slurry. Upon mixing, the sulfuric acid is decomposed while at the same time the coal is digested and gasified. The reaction which takes place as et forth in reaction (8) produces decomposition gases comprising sulfur dioxide, water and carbon dioxide. For tests on gram quantities of coal, the reaction proceeds rapidly with the bulk of the reaction being complete within a few minutes. The decomposition gases are passed out through conduit 120 for further use in a thermochemical system for generating hydrogen or other suitable use.

Alternatively, heat for reaction can be generated by directly injecting oxygen or air into the reactor 110, producing heat by direct reaction of oxygen with coal. This procedure has the advantage of eliminating the need for indirect heat transfer, and increases the ratio of carbon dioxide to sulfur dioxide in the product gases. More coal is used, however, than when using nuclear, solar or other indirect heat source. A suitable oxygen inlet and valve 113 are provided for allowing controlled introduction of oxygen into the reaction 110 when this type of heating is desired.

The decomposition gases produced in accordance with the present invention may be used in a number of different processes. For example, carbon dioxide may be separated out from the sulfur dioxide and water by well known separation techniques to provide a process for producing pure carbon dioxide. Also, the produced sulfur dioxide and water may be passed under pressure through pipes, as in a chemical heat pipe system, to a catalytic bed where the sulfur dioxide is reacted with oxygen to generate heat.

However, the preferred use of the present invention is in water splitting thermochemical cycles where the oxygen release step involves cracking or decomposition of sulfuric acid.

FIG. 2 is a schematic view of a system for a water splitting thermochemical cycle in accordance with the present invention. The system generally includes a thermal reactor 130, a heat exchanger 132, a separator 134 and an electrochemical hydrogen reactor 136. The sulfuric acid which is produced in electrochemical hydrogen generator 136 is passed through conduit 138 and into the heat exchanger 132. Heat exchange fluid is heated in heater 140 by heating mantle 142 or other suitable heating device. Preferably, the heat exchange fluid is a polyperfluoropropylene oxide as disclosed in copending patent application as set forth in the Background. The heat exchange liquid is heated to a temperature of between 300° C. and 400° C. and passed through transfer line 144 and into the heat exchanger 132 where it is directly mixed with the sulfuric acid. Since the heat exchange liquid is not miscible with sulfuric acid, it will rise to the top of the heat exchanger 132 and be removed through removal conduit 146. The heat exchange liquid removed in removal conduit 146 is then passed back to the heater 140 for reheating.

The sulfuric acid which has been heated by direct mixing with the heat exchange fluid forms an immiscible phase on the bottom of heat exchanger 132 and is removed through acid removal line 148. The heated sulfuric acid (300° C. to 400° C.) is then passed to thermal reactor 130. Heating of the sulfuric acid to reaction temperature as described above is preferred since it provides a particularly effective means for efficiently providing heat to the sulfuric acid. However, any other suitable means for heating the sulfuric acid to the desired temperature may be employed. For example, as shown in FIG. 2, a simple heating mantle placed about the thermal reactor 130 would provide a suitable means for heating the sulfuric acid to reaction temperature.

High sulfur coal is fed through feed line 150 into the thermal reactor 130. The high sulfur coal reacts with the sulfuric acid to produce copious amounts of sulfur dioxide, water and carbon dioxide. These decomposition gases are removed from the thermal reactor 130 by way of gas removal line 152. These relatively high temperature decomposition gases are passed to an annular chamber 154 surrounding the electrochemical reactor cell 156. Heat present in the decomposition gases is transferred to the electrochemical reactor cell 156 after which the decomposition gases are removed through line 158 and transferred to separator 134. In separator 134, the carbon dioxide is separated by well known fractionation techniques from the sulfur dioxide and water and removed through carbon dioxide removal line 160. The carbon dioxide may then be used for any number of useful purposes such as carbonating soft drinks or in oil well operations.

The decomposition gases remaining after carbon dioxide separation (sulfur dioxide and water) are then passed through feed conduits 162 and 164 respectively to the electrochemical reactor cell 156. The electrochemical reactor cell 156 contains electrodes 166 and a semipermeable membrane separator 168. The sulfur dioxide and water are electro-chemically converted into hydrogen gas and sulfuric acid. The two products are separated with the hydrogen being removed through product removal line 170 and the sulfuric acid being removed through sulfuric acid conduit 138 for recycling back to heat exchanger 132.

The present invention therefore, provides a suitable thermochemical cycle in which equipment requirements are simplified since high acid cracking temperatures are not necessary, and problems of high temperature acid corrosion are minimized and in the process a relatively undesirable material, i.e. high sulfur coal is utilized in a productive and environmentally safe manner.

Having thus described exemplary embodiments of the present invention, it should be noted by those skilled in the art that the within disclosures are exemplary only and that various other alternatives, adaptations and modifications may be made within the scope of the present invention. For example, at secondary oil recovery sites, a portion of the recovered heavy oil can be utilized in accordance with the present invention to produce carbon dioxide which is pumped down the well during recovery operations. Accordingly, the present invention is not limited to the specific embodiments as illustrated herein.

What is claimed is:

1. A method of thermochemically generating hydrogen and carbon dioxide comprising the steps of:
heating concentrated sulfuric acid to a temperature of from 300° C. to 400° C.;
adding coal containing at least 2% by weight sulfur to said heated sulfuric acid in an amount sufficient to completely decompose said sulfuric acid and reacting said acid and coal to gasify said coal and to decompose said acid to generate decomposition gases consisting essentially of $SO_2$, $H_2O$ and $CO_2$;

separating and recovering carbon dioxide from the decomposition gases;

electrochemically reacting the remaining $SO_2$ and $H_2O$ decomposition gases to form hydrogen gas and sulfuric acid;

recovering the hydrogen gas; and recycling the sulfuric acid to the heating step.

2. An improved method according to claim 1 wherein the sulfuric acid is heated by directly mixing the sulfuric acid with a heated perfluorocarbon liquid that is chemically stable to concentrated sulfuric acid, at 300° C. to 400° C., has a low miscibility with sulfuric acid at said temperature.

3. An improved method according to claim 1 in which the sulfuric acid is heated by heat supplied by heating a heat exchange fluid by means of a thermonuclear reactor and/or solar concentrator heater.

4. A method of gasifying coal containing at least 2 percent by weight of sulfur comprising:

mixing said coal with concentrated sulfuric acid to form a mixture and heating the mixture to between 300° C. and 400° C. whereby said coal reacts with the sulfuric acid to produce decomposition gases comprising $SO_2$, $H_2O$ and $CO_2$.

5. A method according to claim 4 wherein the $CO_2$ is separated from the $SO_2$ and $H_2O$ and the remaining $SO_2$ and $H_2O$ is electrochemically reacted to form hydrogen gas and sulfuric acid.

6. A method according to claim 5 wherein the sulfuric acid produced during said electrochemical reaction is recycled back for heating and reaction with additional amounts of said coal.

7. An improved method according to claim 5 in which the sulfuric acid is heated by direct reaction of an oxygen containing gas with the coal-sulfuric acid mixture.

8. An improved method according to claim 1 in which the mixture is heated by passing oxygen gas into the mixture and reacting the coal with oxygen gas to generate heat.

9. An improved method according to claim 1 in which at least 1 part of coal is present in the mixture of each 15 parts of sulfuric acid.

10. An improved method according to claim 2 in which at least one part of coal is present in the mixture for each 15 parts of sulfuric acid.

* * * * *